Nov. 8, 1927.

F. W. LORD 1,648,735

INCUBATOR

Filed April 28, 1926

Inventor
Fred W. Lord
By
Attorney

Patented Nov. 8, 1927.

1,648,735

UNITED STATES PATENT OFFICE.

FRED W. LORD, OF TIPTON, INDIANA, ASSIGNOR TO THE OAKES MANUFACTURING COMPANY, OF TIPTON, INDIANA, A CORPORATION OF INDIANA.

INCUBATOR.

Application filed April 28, 1926. Serial No. 105,222.

My said invention relates to incubators and consists in various improvements in the details of construction and arrangement of parts, whereby greater efficiency is obtained particularly in securing and maintaining the desired temperature in the egg chamber, all as will hereinafter be more fully described and claimed.

Figure 1:
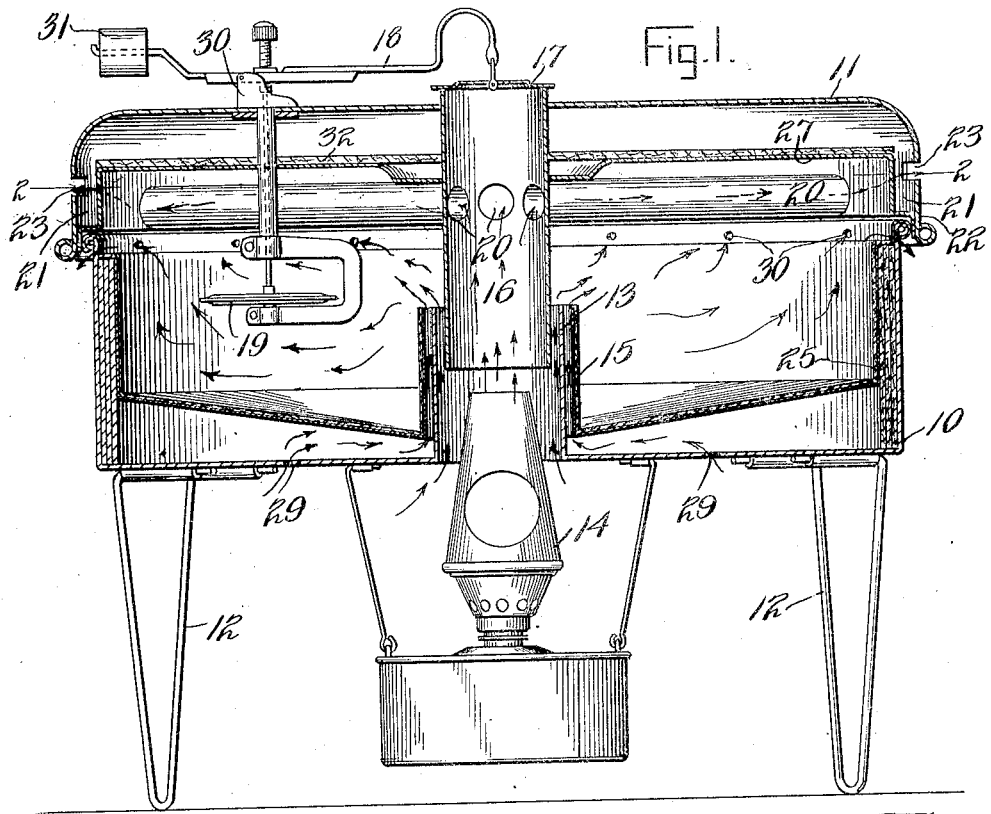
Figure 2:
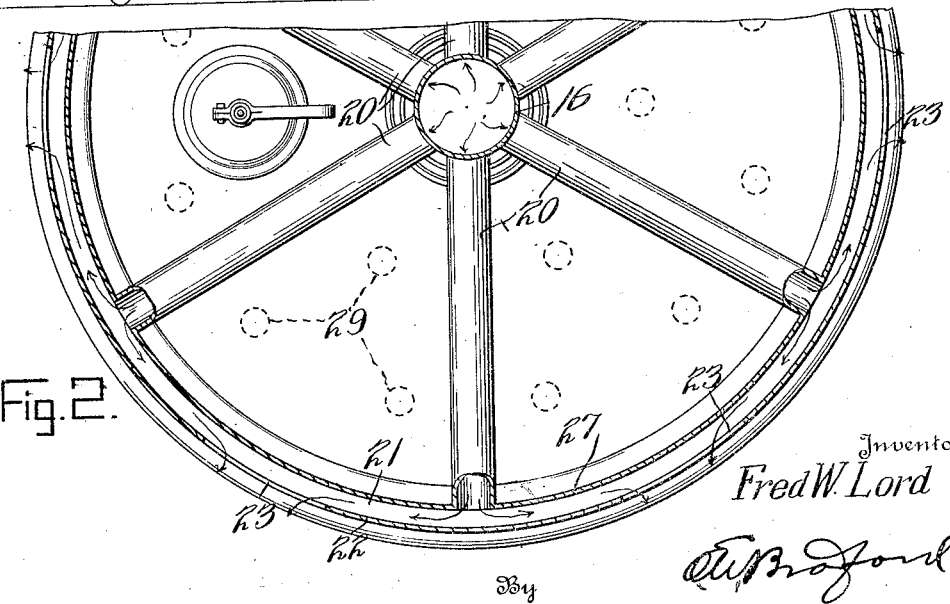

Referring to the accompanying drawings which are made a part hereof and on which similar reference characters indicate similar parts, Figure 1 is a central vertical section of an incubator illustrating the application of my invention, and Figure 2, a fragmentary section on line 2—2 of Figure 1.

In the drawings reference character 10 indicates the body of an incubator, 11 its top and 12 its supporting legs. A tube 13 is mounted centrally in the bottom of the egg chamber providing a central opening and a lamp 14 is supported beneath with its chimney projecting into said tube but spaced annularly therefrom. An egg tray 25 formed with its upper edge rolled over to engage the upper edge of the incubator body is mounted within said body and spaced therefrom with layers of insulating material between, as shown. Its bottom tapers downwardly and is formed with a central opening about which an upstanding annular flange or sleeve 15 is mounted spaced from the sleeve 13. Said egg tray is lined with appropriate material. A central pipe or tube 16 is supported by the top 11 concentric with the tube 13 with its lower end over the lamp and extending for a distance downwardly to within said tube 13. The tube 16 is provided with a top consisting of a disk or damper 17 supported by an arm 18 pivoted on a bracket 30 on said top. A counter-balance weight 31 which nearly balances the disk 17 is mounted on the outer end of said pivoted arm and a thermostat 19 is connected with said arm for controlling the damper and regulating the temperature in a well known manner.

The top or lid is formed to fit the upper edge of the incubator body, its lower edge being formed with a rolled stiffening rib which fits over a similarly formed upper edge of the body. Said lid is composed of the outer wall 11 and an inner wall or partition 27 spaced from each other to provide a hollow top and an annular air chamber, as shown. A sheet of insulating material 32 is mounted over the top of the inner partition 27. Radial pipes 20 connect with the central tube 16 at one end and with the annular chamber in the rim of the lid at the other end. These pipes may be of any number desired, but I have shown six as a desirable number. These pipes are within the upper portion of the egg chamber, spaced below the partition 27, so that in use they will radiate heat downwardly into said egg chamber. The edge 22 of the lid or top is provided with a series of perforations 23 at spaced intervals about the same for the escape of hot air, as will be presently described. The bottom of the incubator body is provided with perforations 29 for the ingress of fresh air and a series of outlet openings 30 are provided around its upper edge to discharge immediately beneath the lower edge of the lid or top, as shown.

The walls of the body and the bottom of the egg chamber, as well as the top surface of partition 27, are lined with insulating material, as shown.

In operation the eggs are placed upon the surface of the egg tray 25 in the usual manner and heat from the lamp 14 heats the air passing up through the central openings and tubes into tube 16 and out through the radial pipes 20 into the hollow lid, said tubes radiating the heat downwardly into the egg chamber and raising the temperature of the air within said chamber to the predetermined degree, regulated by the position of weight 31 and the operation of thermostat 19, as will be readily understood. Fresh air comes into the body of the incubator through the apertures 29, passes up between tubes 13 and 15 and is heated by the heat generated by the lamp at this point and passes out through the small apertures 30 at the upper edge of the chamber, thus providing the necessary ventilation, as well as obtaining the predetermined temperature required to secure the most efficient results. When the temperature in the egg chamber exceeds said predetermined degree the thermostat 19 will operate to open the damper 17 when the heat from the lamp will pass directly through tube 16 to the outer air until the temperature falls to below the predetermined degree, when the damper will automatically close and hot air provided by the means before described will again circulate through the radial pipes 20 and out through the annular chamber in the lid discharging through the apertures 23, the heat units being radiated downwardly from said pipes toward the eggs supported upon the egg tray, all as will be readily understood. By this means the desired temperature can be maintained and a very accurate and sensitive regulation secured.

It will be seen that the hot air chambers are substantially in the form of the hub, spokes and rim of a wheel with outlet openings in the rim between the spokes.

While I have shown my invention as applied to a metal incubator of circular form, nevertheless, obviously other types of incubators may be provided with my invention, and I do not wish to limit myself to the structure shown in the drawings, but only as indicated in the appended claims.

Having thus fully described my said invention, what I claim as new and desire to secure by Letters Patent, is:

1. An incubator comprising a body containing an egg tray and having a central aperture, a lid formed hollow and provided with a central tube, a thermostatically controlled damper on said tube, a heating element mounted beneath the central opening in the incubator, and radial pipes leading from the central tube in the lid to an annular space around its edge, said pipes being located beneath the inner wall of said lid and adapted to radiate heat directly into the egg chamber, substantially as set forth.

2. An incubator comprising a body having insulated walls, a perforated bottom and a central opening with an upstanding tube surrounding said opening, and outlet openings formed around its upper edge; an egg tray mounted within said body and having a central opening surrounded by an upstanding tube which is of larger diameter than the central tube of said body providing an annular space between said tubes; a heating element supported beneath the central opening in said body; a lid adapted to fit on the upper edge of said body and formed with spaced walls to provide an air chamber both in the top and around the edges thereof with outlet openings through the outer wall; a series of radial pipes connected at one end with the central tube carried by said lid and at the other end with the annular air chamber in said lid; and a thermostatically controlled damper for controlling the discharge of air out of the top of said central tube through said lid, substantially as set forth.

3. A lid for an incubator formed with spaced walls to provide an air chamber both in the top and around the edge thereof, and heat conducting pipes located beneath the inner wall of said lid and forming communication with said air chambers, substantially as set forth.

4. An incubator comprising a body containing an egg tray and having an aperture, a lid for said body formed hollow and provided with a tube corresponding in arrangement to said aperture, a heating element mounted beneath said aperture, and pipes leading from the tube in the lid to the annular space around its edge, said pipes being located beneath the inner wall of said lid and adapted to radiate heat directly into the egg chamber, substantially as set forth.

5. An incubator comprising a body having an opening with an upstanding tube surrounding said opening, an egg tray within said body having an opening corresponding in arrangement to the opening in said body and surrounded by an upstanding tube of larger diameter than the tube of said body and providing an annular space between said tubes, a heating element supported beneath the opening in said body, a lid adapted to fit over the upper edge of said body, said lid being formed with spaced walls to provide an air chamber both in the top and around the edge thereof, and a series of pipes connected at one end with the tube carried by said lid and at the other end with the air chamber in said lid, substantially as set forth.

In witness whereof, I have hereunto set my hand at Tipton, Indiana this twenty-sixth day of April, A. D. nineteen hundred and twenty-six.

FRED W. LORD.